United States Patent [19]

Nielsen et al.

[11] Patent Number: 6,049,342

[45] Date of Patent: Apr. 11, 2000

[54] SYSTEM AND METHOD FOR CONTROLLING THE DOWNLOADING AND DISPLAY OF AN ANIMATED SEQUENCE FROM A NETWORK

[75] Inventors: Christopher Robbins Nielsen; Ricky Lee Poston; Stephen Gray Stair; I-Hsing Tsao, all of Austin, Tex.

[73] Assignee: International Business Machines Corporation, Armonk, N.Y.

[21] Appl. No.: 08/958,075

[22] Filed: Oct. 27, 1997

[51] Int. Cl.[7] .................................................. G06T 15/70
[52] U.S. Cl. ............................................................ 345/473
[58] Field of Search ..................................... 345/473, 327; 707/516

[56] References Cited

U.S. PATENT DOCUMENTS

| | | | |
|---|---|---|---|
| 5,838,316 | 11/1998 | Arruza | 345/334 |
| 5,864,366 | 1/1999 | Yeo | 345/409 |

Primary Examiner—Mark R. Powell
Assistant Examiner—Thu Nguyen
Attorney, Agent, or Firm—Leslie A. Van Leeuwen; Thomas E. Tyson

[57] ABSTRACT

The present invention is a system, method, and computer readable medium for controlling the downloading and display of animated sequences from a server to a client. A user chooses which, if any, animated sequences to view on a Web page. Before downloading a graphics file associated with a particular Web page, the server checks the file to determine if it contains any animated sequences. If the graphics file contains an animated sequence, the server only downloads the first graphic image of the animated sequence. This first graphic image is presented as a static image to the user. By only downloading the first graphic image, download time is reduced and less memory and disk space is used in the client. The user views the static image presented on the screen, and then determines if he wishes to view the entire animated sequence. If so, the user indicates that he wishes to view the entire animated sequence. The server then downloads and executes the entire graphics file, allowing the user to view the entire animated sequence.

24 Claims, 3 Drawing Sheets

SYSTEM AND METHOD FOR CONTROLLING THE DOWNLOADING AND DISPLAY OF AN ANIMATED SEQUENCE FROM A NETWORK

FIELD OF THE INVENTION

The present invention relates to the field of information handling systems, and, more particularly, to a system and method for controlling the downloading and display of an animated sequence from a network.

BACKGROUND OF THE INVENTION

The World Wide Web is the Internet's multimedia information retrieval system. In the Web environment, client machines communicate with Web servers using the Hypertext Transfer Protocol (HTTP). HTTP is an application protocol providing users access to files (e.g., text, graphics, images, animation, sound, video, etc.) using a standard page description language known as Hypertext Markup Language (HTML). HTML provides basic document formatting and allows a developer to specify "links" to other servers and files. In the Internet paradigm, a network path to a server is identified by a Uniform Resource Locator (URL) having a specified syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

More and more Web sites contain animated sequences which are downloaded to a user's system when the user accesses the Web site. These animated sequences are often contained in graphics files, such as Graphics Interchange Format (GIF) files. The increasing size and complexity of these animated sequences increases the length of time it takes to download a Web page. Many times a user is not interested in the animated sequences. For example, many Web pages contain animated advertisements. The user may be interested in the actual contents of the Web page, but may not be interested in the animated advertisements present on the Web page. Other times, the user may be interested in some, but not all, of the animated sequences contained on a Web page.

Consequently, it would be desirable to have a system and method for controlling the downloading and display of animated sequences over a network. It would be desirable to allow a user to choose which animated sequences, if any, are downloaded and executed. It would further be desirable to give the user a preview of the animated sequences which may be selected for full downloading, in a manner which is fast, efficient, and uses little client memory or disk space.

SUMMARY OF THE INVENTION

Accordingly, the present invention is directed to a system, method, and computer readable medium for controlling the downloading and display of animated sequences from a server to a client. The present invention allows a user to choose which, if any, animated sequences to view on a Web page. Before downloading a graphics file associated with a particular Web page, the server checks the file to determine if it contains any animated sequences. Animated sequences typically consist of more than one graphic image. Therefore, if the graphics file contains multiple graphic images, it is considered to contain an animated sequence. The exact method used to check for animation will vary, of course, depending on the type of graphics file being used.

If the graphics file contains more than one graphic image, the server only downloads the first graphic image. This first graphic image is downloaded and displayed as a static image in the location on the Web page where the entire animation sequence would otherwise be displayed. The user may view the static image presented on the screen, and then determine if he wishes to view the entire animated sequence. If so, the user selects a choice from a menu (or otherwise indicates that he wishes to view the entire animated sequence). The server then downloads and executes the entire graphics file, allowing the user to view the entire animated sequence.

The method of the present invention may be implemented in an information handling system which includes a client, a server, and a means for receiving client requests in the server. Another aspect of the invention is as sets of instructions resident in an information handling system, or stored on a computer readable medium, such as a diskette, tape, CD-ROM, or other medium.

One advantage of the present invention is that a user can choose which animated sequences, if any, are downloaded and executed. Another advantage of the present invention is that the user is given a preview of the animated sequences, in the form of the fist image of the sequence. This preview is implemented in a manner which is fast, efficient, and uses little client memory or disk space.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
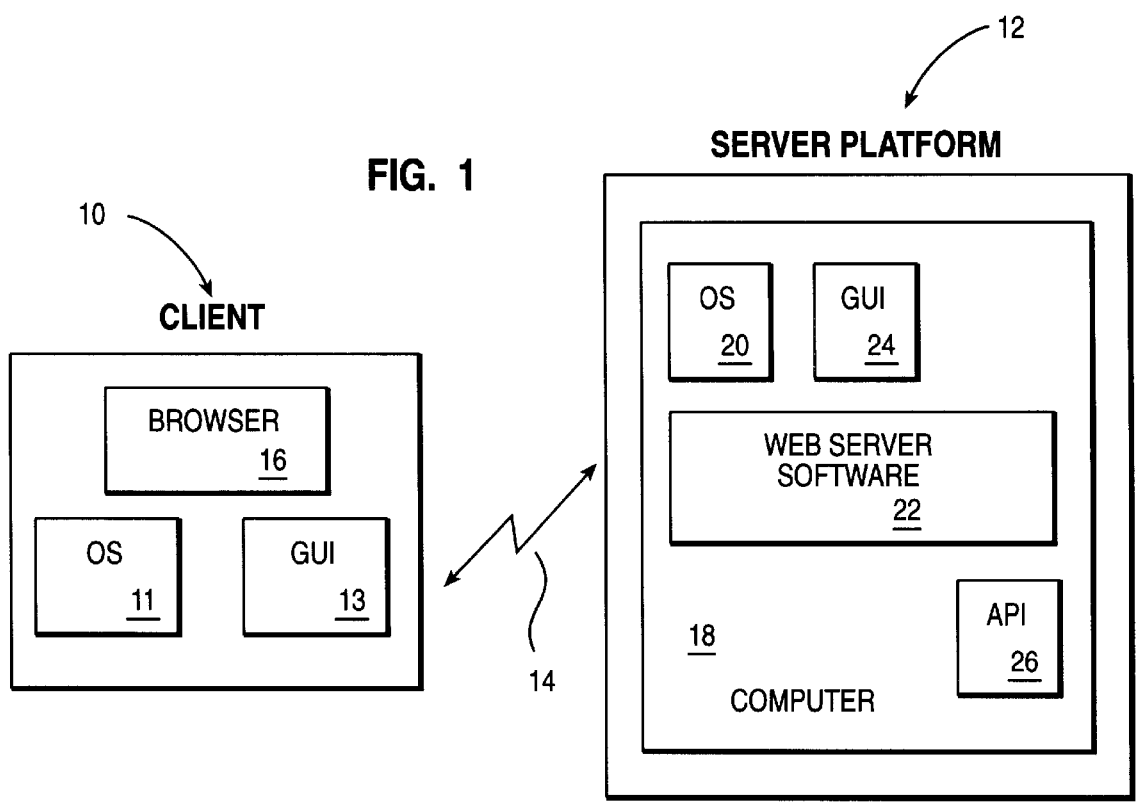
FIG. 1 is a block diagram of an information handling system implementing the present invention.

A representative information handling system in which the present invention is implemented is illustrated in FIG. 1. A client machine 10 is connected to a Web server platform 12 via a communication channel 14. For illustrative purposes, channel 14 is the Internet, an intranet or other known network connection. Web server platform 12 is one of a plurality of servers which are accessible by clients, one such client being illustrated by machine 10. A representative client machine includes an operating system 11, a graphical user interface 13, and a browser 16. A browser is a known software tool used to access the servers of a network, such as the Internet. Representative browsers include, among others, Netscape Navigator, Microsoft Internet Explorer or the like, each of which are "off-the-shelf" or downloadable software programs. The Web server platform (sometimes referred to as a "Web" site) supports files in the form of hypertext documents and objects. In the Internet paradigm, a network path to a server is identified by a Uniform Resource Locator (URL). The World Wide Web is the Internet's multimedia information retrieval system. In particular, it is a collection of servers of the Internet that use the Hypertext Transfer Protocol (HTTP), which provides users access to files, sometimes referred to as Web pages, using Hypertext Markup Language (HTML).

A representative Web Server platform 12 comprises an IBM RISC System/6000 computer 18 running the AIX (Advanced Interactive Executive) Operating System 20 and a Web server program 22, such as Netscape Enterprise Server Version 2.0, that supports interface extensions. The platform 12 also includes a graphical user interface (GUI) 24 for management and administration. The various models of the RISC-based computers are described in many publications of the IBM Corporation, for example, *RISC System 6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/Web server combinations may be used.

The Web Server accepts a client request and returns a response. The operation of the server program 22 is governed by a number of server application functions (SAFs), each of which is configured to execute in a certain step of a sequence. This sequence, illustrated in FIG. 2, begins with authorization translation (step 30), during which the server translates any authorization information sent by the client into a user and a group. If necessary, the authorization translation step may decode a message to get the actual client request. During name translation (step 32), the URL associated with the request may be kept intact or it can be translated into a system-dependent file name, a redirection URL or a mirror site URL. Next, path checks are performed (step 34), during which the server performs various tests on the resulting path to ensure that the given client may retrieve the document. During the object types step (step 36), MIME (Multipurpose Internet Mail Extension) type information (e.g., text/html, image/gif, etc.) for the given document is identified. During the service step (step 38), the Web server routine selects an internal server function to send the result back to the client. This function can run the normal server service routine (to return a file), some other server function (such as a program to return a custom document) or a CGI program. Information about the transaction is recorded at the address log step (step 40). If an error has been encountered at any step along the way, the server responds to the client when it encounters the error (step 42). Further details of these operations may be found in the Netscape *Web Server Programmer's Guide*, Chapter 5, which is incorporated herein by reference.

Thus, the Web server 18 includes a known set of server application functions (SAFs). These functions take the client's request and other configuration data of the server as input and return a response to the client as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins."

The present invention is a system, method, and computer readable medium for controlling the downloading and display of animated sequences from a server to a client. Animated sequences are typically stored in graphics files. One popular type of graphics file is known as a Graphics Interchange Format (GIF) file. For illustrative purposes, the present invention will be described with reference to downloading a GIF file from a server to a client utilizing a browser in an Internet environment. Those skilled in the art will realize that the present invention may be implemented with any type of graphics file and in any type of network situation, including, but not limited to the Internet, intranets, and other types of networks.

More and more Web sites are using animated sequences, and the size and complexity of these animated sequences is increasing at a rapid rate. The use of animation on a Web page increases the time it takes for a browser to download and display the page. In addition, the animation present on a downloaded Web page consumes valuable system resources in the client, such as memory and disk space. This can become annoying to users who do not always wish to see all the animation contained on a Web page. There may also be times where a user is not sure if he wants to see some or all of the animation present on a particular Web page.

The present invention allows a user to choose which, if any, animated sequences to view on a Web page. Before downloading a graphics file associated with a particular Web page, the server checks the file to determine if it contains any animated sequences. This exact method used to check for animation will vary depending on the type of graphics file being used. For a GIF file, the server will check for multiple Graphic Blocks. In a GIF file, each frame of animation is represented by a Graphic Block. Therefore, if more than one Graphic Block is in the file, the file contains an animated sequence.

If a GIF file contains more than one Graphic Block, the server only downloads the first Graphic Block. This first Graphic Block is downloaded and displayed as a static image in the location on the Web page where the entire animation sequence would otherwise be displayed. The user may view the static image presented on the screen, and then determine if he wishes to view the entire animated sequence. If so, the user indicates that he wishes to view the entire animated sequence. The user may accomplish this through any one of a variety of selection schemes. For example, the user may move a mouse pointer over the static image, click the alternate mouse button, and select "run animation" from a pop-up menu. The server then downloads all the Graphic Blocks, including the first one, to the client, and the user thus views the entire animated sequence.

By only downloading the first Graphic Block in an animated sequence, the Web page may be efficiently downloaded and displayed. No time is wasted downloading animation in which the user is not interested. In addition, valuable memory and disk space is saved in the client, as only the first Graphic Block is stored. The user may then pick and choose which, if any, animated sequences he wishes to view.

Figure 2:
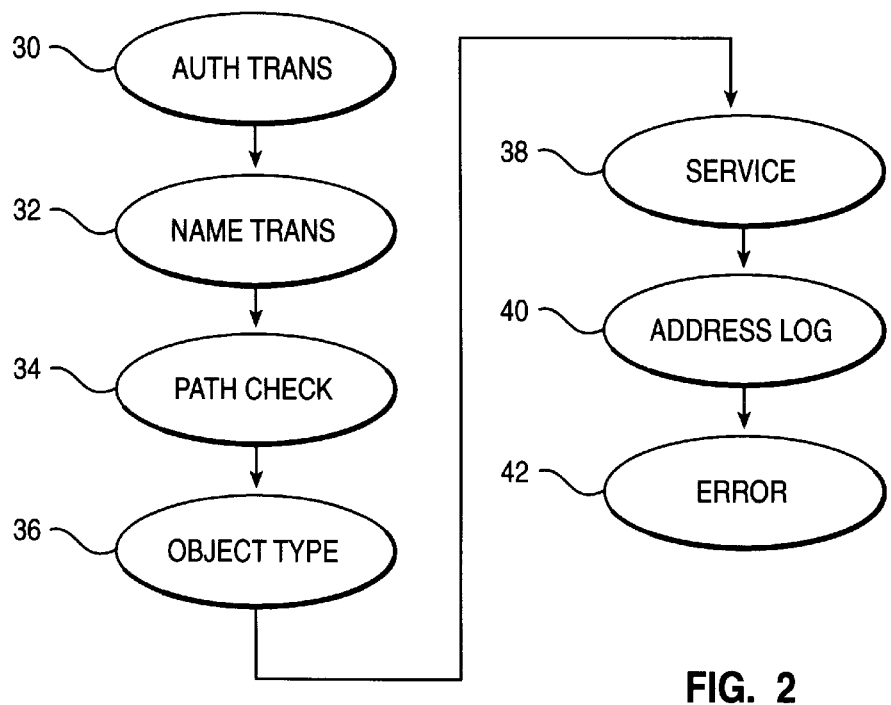
FIG. 2 is a flowchart illustrating the conventional processing associated with an HTTP request from a Web client to a Web server.
Figure 3A:
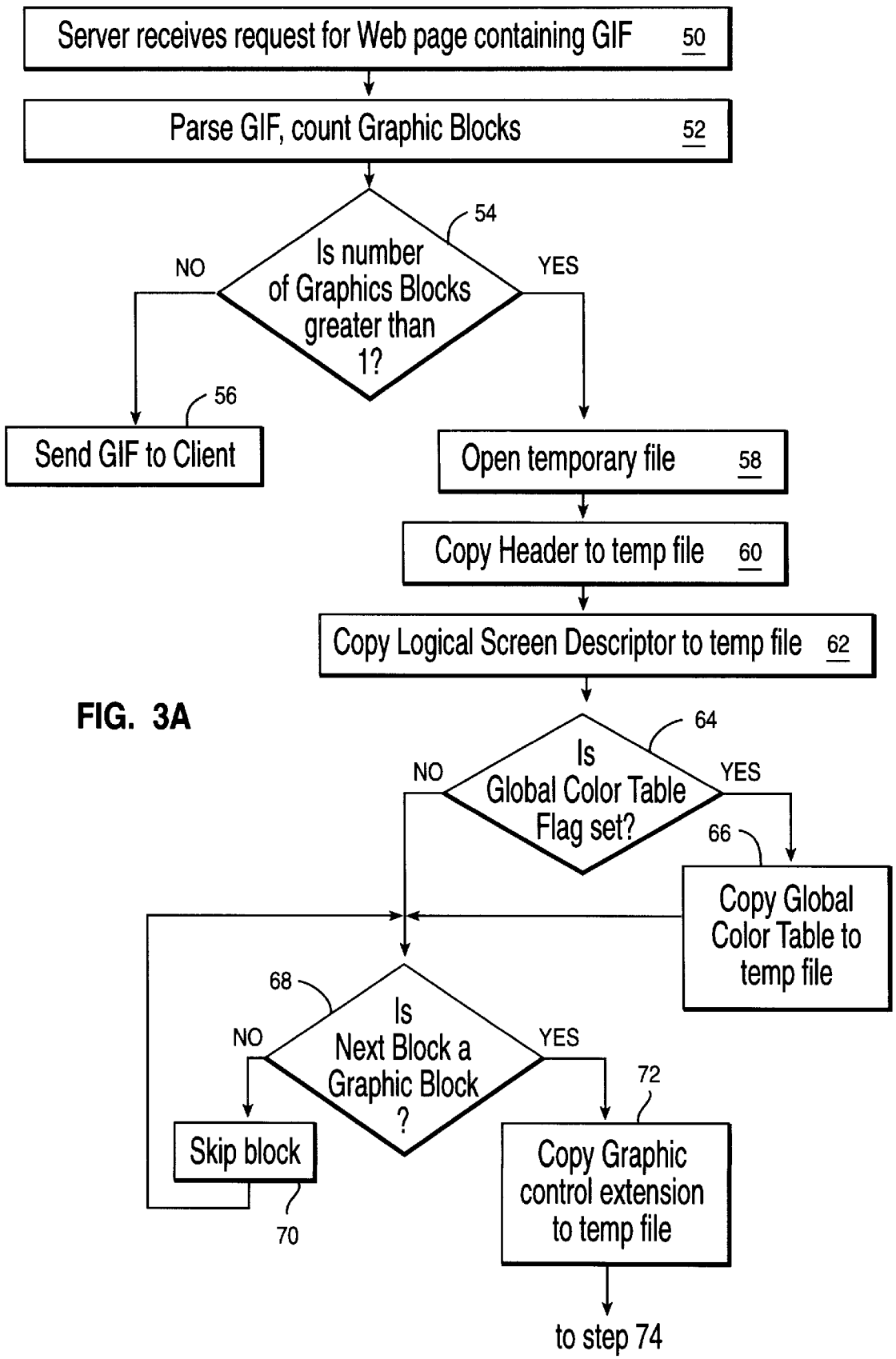
FIGS. 3A and 3B are a flowchart illustrating a method for downloading and displaying an animated sequence according to the teachings of the present invention.
Figure 3B:
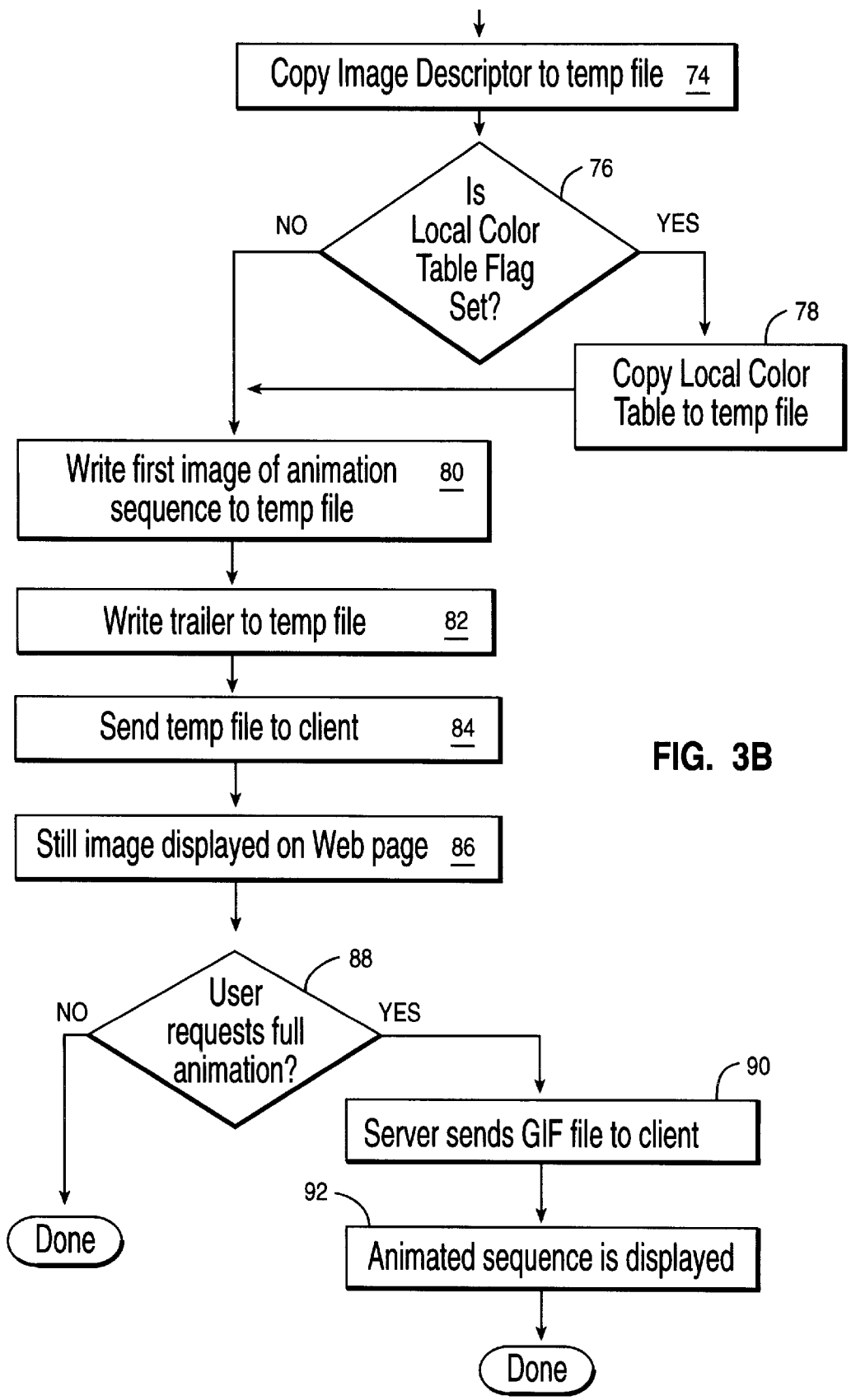

The present invention is preferably executed during the object types step (step 36) depicted in FIG. 2. Referring now to FIG. 3, a flowchart showing the steps for controlling the downloading and display of an animated sequence will now be described. While performing object type checking, a server determines that the requested Web page contains a GIF file (step 50). Note that a single Web page may contain many GIF files, however, the invention will be described with reference to one GIF file. The server parses the GIF file, counting the number of Graphic Blocks in the file (step 52). The server then tests to see if the number of Graphic Blocks is greater than one (step 54). If there is only a single Graphic Block in the GIF file, it is a still image, and is therefore downloaded as usual, along with the rest of the Web page (step 56).

If there is more than one Graphic Block in the GIF file (i.e. the answer to the question in step 54 is "yes"), then the GIF file contains an animated sequence. A temporary file is opened (step 58), and the GIF Header is copied from the GIF file to the temporary file (step 60). The Logical Screen Descriptor is also copied from the GIF file to the temporary file (step 62). Next, a check is made to determine if the Global Color Table Flag in the Logical Screen Descriptor is set (step 64). If it is set, the Global Color Table is copied from the GIF file to the temporary file (step 66).

Next, the first Graphic Block is located and written to the temporary file. This is accomplished by checking each block to determine if it is a Graphic Block (step 68). All other blocks (e.g., Control Blocks) are skipped (step 70). When the first Graphic Block is found, the Graphic Control Extension is copied to the temporary file (Step 72). Next, the Image Descriptor is copied to the temporary file (step 74), and then a check is made to determine if the Local Color Table Flag in the Logical Screen Descriptor is set (step 76). If it is, the Local Color Table is copied to the temporary file (step 78).

Next, the image data itself is written to the temporary file (step 80). This image data consists of only the first image (i.e. the first Graphic Block) of the animation sequence. A trailer is then written to the temporary file (step 82) , and the temporary file is then closed and downloaded from the server to the client (step 84). At this point, the user views the still image that has been downloaded (step 86), and may request to have the entire animated sequence downloaded. If the user requests the entire animated sequence (step 88), the entire GIF file is downloaded (step 90), and displayed in the client (step 92).

One of the many pseudocode listings which could be implemented to practice the disclosed methodology is presented below:

Browser
   Send request for Web page containing GIF file
Server
   Receive request for Web page containing GIF file Parse GIF file, counting Graphic Blocks if (number of Graphic Blocks =1) then
   Send GIF file
else
   Open temporary file
   Read and write header
   Read and write Logical Screen Descriptor
if (Global Color Table Flag is set) then
   Read and write Global Color Table
while (next block is not a Graphic Block) then
   Skip block
done
   Read and write Graphic Control Extension
   Read and write Image Descriptor
if (Local Color Table Flag is set) then
   Read and write Local Color Table
   Read and write Image Data
   Write trailer
   Close temporary file
   Send temporary file
Browser
   Send request for animated image
Server
   Receive request for entire animated image
   Send GIF file
Browser
   Display animated GIF Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for displaying an animated sequence in a client, the client connected to a server in a computer network, comprising the steps of:

determining if a graphics file contains an animated sequence;

in response to said determining, if the graphics file contains an animated sequence, then performing the following:

downloading only a single graphic image of the animated sequence;

displaying the single graphic image in the client; and upon request from a user, downloading the entire animated sequence for display in the client.

2. A method according to claim 1, wherein said determining step further comprises the step of determining a number of graphic blocks contained in the graphics file.

3. A method according to claim 2, wherein if the number of graphic blocks contained in the graphics file is greater than one, then it is determined that the graphics file contains an animated sequence.

4. A method according to claim 1, wherein said step of downloading only a single graphic image comprises the steps of:

opening a temporary file;

copying a single graphic image in the animated sequence from a graphics file to the temporary file; and downloading the temporary file from the server to the client.

5. A method according to claim 4, wherein said copying step further comprises the steps of:

copying a header from the graphics file to the temporary file;

copying a logical screen descriptor from the graphics file to the temporary file;

copying a graphic control extension from the graphics file to the temporary file;

copying an image descriptor from the graphics file to the temporary file; and writing a trailer to the temporary file.

6. A method according to claim 5, further comprising the steps of:

determining if a global color table flag is set in the logical screen descriptor; and if the global color table flag is set, copying a global color table from the graphics file to the temporary file.

7. A method according to claim 5, further comprising the steps of:

determining if a local color table flag is set in the logical screen descriptor; and if the local color table flag is set, copying a local color table from the graphics file to the temporary file.

8. A method according to claim 1, wherein said step of displaying the single graphic image in the client further comprises the step of prompting the user to choose whether to download the entire animated sequence from the server to the client.

9. An information handling system, comprising:

a server;

a client;

a network for connecting the client to the server;

means for determining if a graphics file contains an animated sequence, having one or more graphic images;

means for downloading only a single graphic image of the animated sequence from the server to the client;

means for displaying the single graphic image in the client;

means for receiving a client request in the server; and means for responding to the client request by downloading the entire animated sequence from the server for display in the client.

10. An information handling system according to claim 9, wherein said means for determining further comprises means for determining a number of graphic blocks contained in the graphics file.

11. An information handling system according to claim 10, wherein if the number of graphic blocks contained in the graphics file is greater than one, then it is determined that the graphics file contains an animated sequence.

12. An information handling system according to claim 9, wherein said means for downloading only a single graphic image comprises:

means for opening a temporary file;

means for copying a selected graphic image in the animated sequence from the graphics file to the temporary file; and means for downloading the temporary file from the server to the client.

13. An information handling system according to claim 12, wherein said means for copying further comprises:

means for copying a header from the graphics file to the temporary file;

means for copying a logical screen descriptor from the graphics file to the temporary file;

means for copying a graphic control extension from the graphics file to the temporary file;

means for copying an image descriptor from the graphics file to the temporary file; and means for writing a trailer to the temporary file.

14. An information handling system according to claim 13, further comprising:

means for determining if a global color table flag is set in the logical screen descriptor; and means for copying a global color table from the graphics file to the temporary file.

15. An information handling system according to claim 13, further comprising:

means for determining if a local color table flag is set in the logical screen descriptor; and means for copying a local color table from the graphics file to the temporary file.

16. An information handling system according to claim 9, wherein said means for displaying the single graphic image in the client further comprises means for prompting the user to choose whether to download the entire animated sequence from the server to the client.

17. A computer readable medium for controlling the display of a graphics file in a client connected to a server, comprising:

means for determining if the graphics file contains an animated sequence, having one or more graphic images;

means for downloading only a single graphic image of the animated sequence from the server to the client;

means for displaying the single graphic image in the client;

means for receiving a client request in the server; and means for responding to the client request by downloading the entire animated sequence from the server for display in the client.

18. A computer readable medium according to claim 17, wherein said means for determining further comprises means for determining a number of graphic blocks contained in the graphics file.

19. A computer readable medium according to claim 18, wherein if the number of graphic blocks contained in the graphics file is greater than one, then it is determined that the graphics file contains an animated sequence.

20. A computer readable medium according to claim 17, wherein said means for downloading only a single graphic image comprises:

means for opening a temporary file;

means for copying a selected graphic image in the animated sequence from the graphics file to the temporary file; and means for downloading the temporary file from the server to the client.

21. A computer readable medium according to claim 20, wherein said means for copying further comprises:

means for copying a header from the graphics file to the temporary file;

means for copying a logical screen descriptor from the graphics file to the temporary file;

means for copying a graphic control extension from the graphics file to the temporary file;

means for copying an image descriptor from the graphics file to the temporary file; and means for writing a trailer to the temporary file.

22. A computer readable medium according to claim 21, further comprising:

means for determining if a global color table flag is set in the logical screen descriptor; and means for copying a global color table from the graphics file to the temporary file.

23. A computer readable medium according to claim 21, further comprising:

means for determining if a local color table flag is set in the logical screen descriptor; and means for copying a local color table from the graphics file to the temporary file.

24. A computer readable medium according to claim 17, wherein said means for displaying the single graphic image in the client further comprises means for prompting the user to choose whether to download the entire animated sequence from the server to the client.

* * * * *